Figure 6:
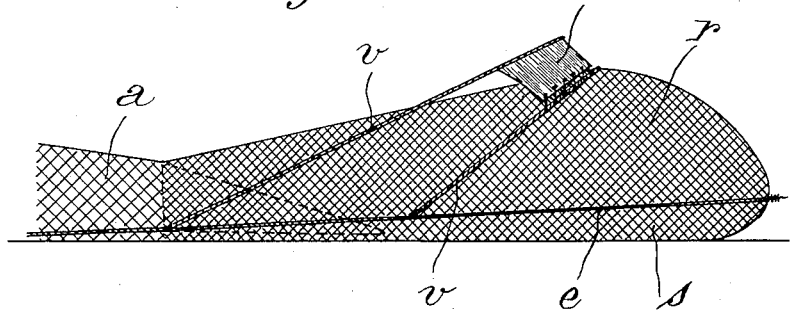

May 9, 1933.  A. V. A. ROBERT  1,908,488
DRAGNET AND THE LIKE
Filed Jan. 20, 1931   3 Sheets-Sheet 1
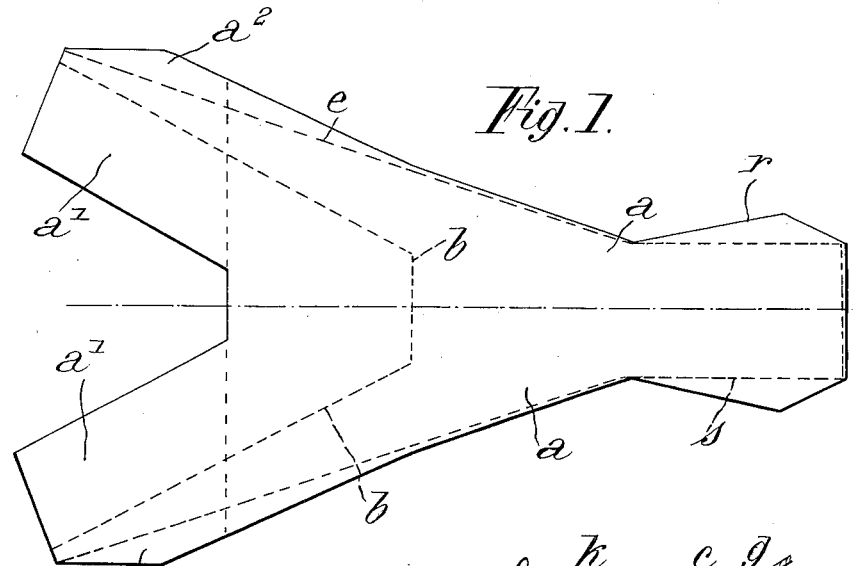
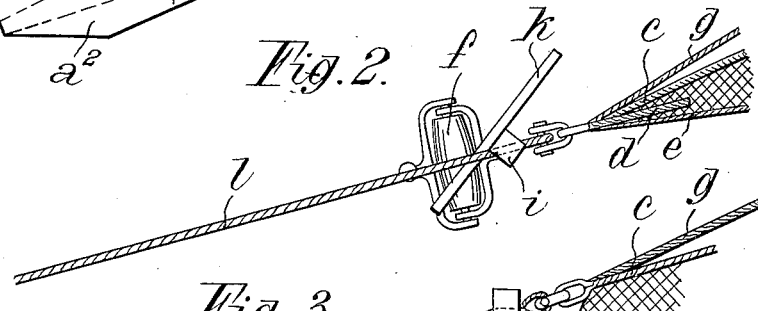
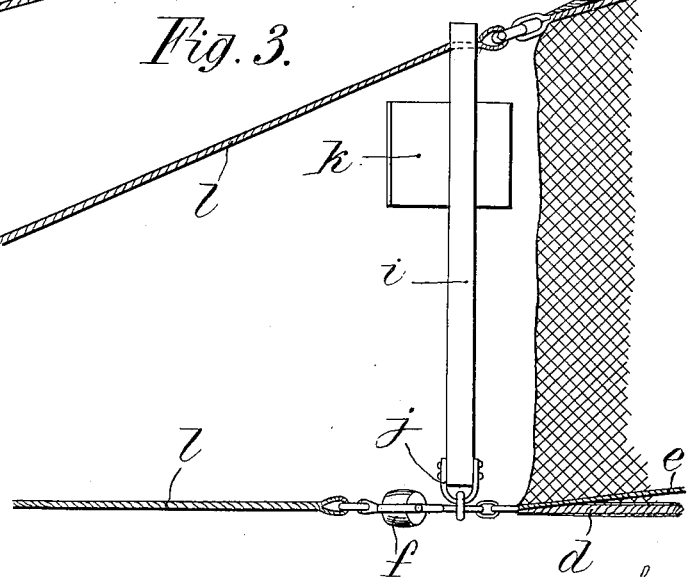

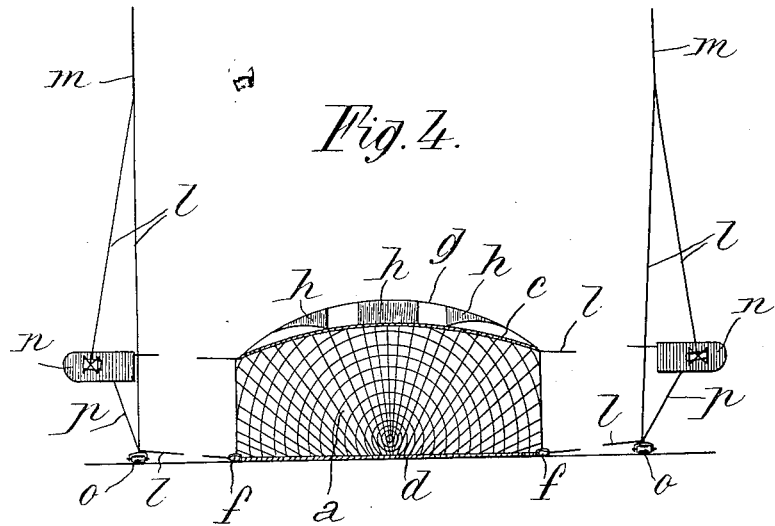
Fig. 4.
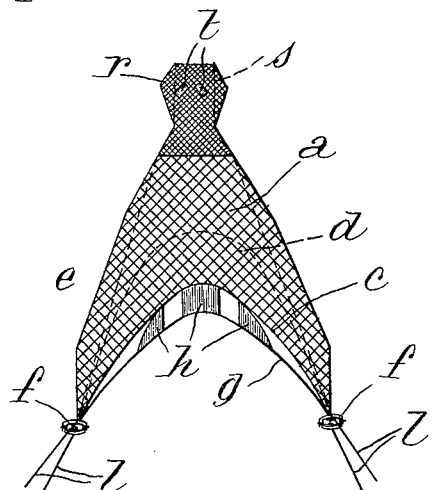
Fig. 5.
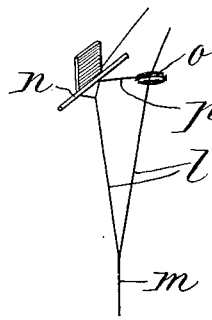
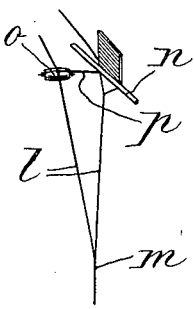

Patented May 9, 1933

1,908,488

UNITED STATES PATENT OFFICE

ALPHONSE VICTOR ALEXANDRE ROBERT, OF LORIENT, FRANCE, ASSIGNOR TO SOCIÉTÉ ANONYME "ENGINS DE PÊCHE MARITIME", OF PARIS, FRANCE, A COMPANY OF FRANCE

DRAGNET AND THE LIKE

Application filed January 20, 1931. Serial No. 509,929.

In sea fishing there is generally employed drag nets with diverging panels towed by a single tug and consisting of two fishing nets composed of a top and bottom connected together to form a pocket. The height of the opening of this pocket is very much reduced owing to the fact that it is limited either by the height of the panels attached directly to the drag net or by spars called "stays" which are secured at each side of the opening when the panels are moved away from it. In this latter case floats or elevators are secured on the upper part of the drag net in order to increase the central height of its opening.

The two fishing nets, top and bottom, are more or less of the same size and the amplitude which is to permit the opening out of the top, is of minimum size.

It has been suggested to dispose bellows between the two fishing nets or to make the bottoms or the tops larger one than the other; but the top of the net is straddled by its reinforcement and at its opening, by the stays when these are small in height.

The elevators are secured either to the top of the drag net which draws them along or to the interior of the inlet which they have to lift. Similarly to the floats (glass globes or other types) they have a lifting power which is more or less considerable but they have the same inconveniences of being carried at the back of the drag net as the speed increases; their action is thus much lessened, the cumbersomeness of certain of these apparatus is often a cause of their rejection by the crew whose actions they hamper.

The stays for producing their full effect must be maintained in the perpendicular plane at the bottom. Now their traction is defective owing to the fact that they are in contact with the bottom and their upper part which supports the head rope of the top of the drag net that is to say the back cord is pulled inwardly. It results that the stays take a considerable inclination which considerably reduces their height in the vertical plane and causes the deformation of the drag net.

Stays have been constructed which were articulated on a sole piece; in this case the rubbing surface on the bottom is increased and the main cause of the inclination subsists.

The panels whether secured on the drag net or at a certain distance, rub the bottom so creating a resistance to traction which is relatively high. Floating panels have been used but their method of attachment to the net and an insufficient or not easily operable ballast did not permit of obtaining the output sought.

Finally the sack at the end of the drag net is of dimensions which are too small so that the fish get crushed and its meshes closed during the trawling counteracting the outflow of water.

The invention relates to improvements in the whole of the dragging apparatus with a view to overcoming all the inconveniences which have been exposed above. These improvements apply to the drag net and its floats, to the stays, the method of attachment of the panels with depth gauge and to the collecting sack for the net.

Figure 7:
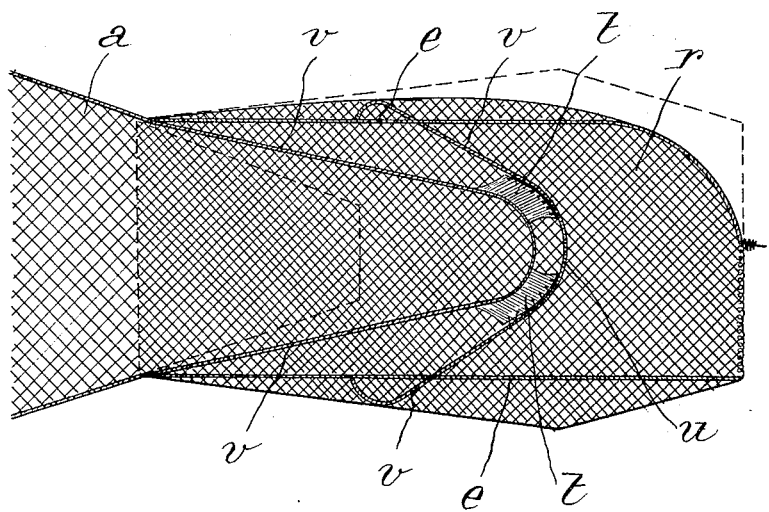

A constructional form of the invention is represented by way of example in the accompanying drawings in which:

Figure 1 shows a diagrammatic view, in flat state, of the two parts, top and bottom, forming the drag net; Fig. 2 shows in plan one of the stays and its method of mounting on the drag net. Fig. 3 is a corresponding view in elevation. Fig. 4 is a front view of the whole of the drag net provided with lifters and the arrangement of its panels with depth gauges. Fig. 5 is a plan view. Fig. 6 shows separately, the bag or collector of the net, in elevation. Fig. 7 is a plan view of same.

As will be seen on the drawings, Fig. 1 the two nets constituting the drag net are absolutely different from each other. The upper one $a$ shown in full lines, is much larger than the lower one $b$, shown in dotted lines.

The shape of the wings $a^1$ of the upper net $a$ produces an angle $a^2$ to the two external parts. This angle has for its object to give considerable amplitude to the wings and the large back or larger upper net and to permit to the head cord c which connects the top to the bottom, of exercising a pull on the whole of the drag net in a straight line from the extremity of the pad d to the drag net collector.

This head cord is connected to the ends of the pad d where are disposed two cast iron rollers f which ensure contact with the bottom which it rubs like the bottom of the drag net.

The parts of the net which constitute it are arranged in such a manner as to have no back lash. The three mounting back cords c, pads d and head cord e, or the side cord are of steel wire and hawser rope mixed to avoid any deformation or shrinking or lengthening produced by the different hygrometric states of the hawser rope.

The elevator must trawl the ground or back cord c. For this purpose the rope g (Figs. 4 and 5) is disposed on the top of the drag net starting from the extremities of the opening in such a manner that when the net is open, it is disposed above and in front of the back cord. Between this hawser rope or fabric cord and the back cord are placed sheets h of determined dimensions and shapes so that their velic point shall be at a suitable position. These sheets act at an angle which is variable by the length given to the cord g and they cause under the traction and the pressure of water, the lift of the median part of the top and the entry to the drag net.

At the bag or net collector shown separately at Figs. 5 and 6 the upper part r is likewise larger than the lower part s and permits the swelling.

The collectors of ordinary drag nets are eliminated; the fish are no longer stopped at that part of the net (neck) the size of which is not diminished. A net commences at the cords at the entry of the bag and prevents the fish from coming out.

Two small nets t are disposed at the upper part of the bag on each side of the longitudinal axis and in a manner so as to provide between them, in this median part, a free space u. The upper part of the sack is reinforced at the fixation point of the nets t, this fixation being effected by a loose cross-netting which permits the water to evacuate between the nets and the drag net. The nets are retained at a certain angle by light cables v from the cords e.

During trawling the nets t open in the manner of a valve by lifting the upper net r of the sack. Moreover, the free space u existing between them and the inclination in relation to the axis of the drag net causes them to diverge and open the meshes.

This particular arrangement has for its object:

1. To give a very large capacity to the drag net sack and consequently to permit the fish to remain without being suffocated and crushed.

2. To produce the evacuation of the current of water by the open meshes between the nets. It is known that the fish always rush towards the orifices; they are therefore prone to keep always near the upper part of the sack where there is space and where their conservation is ensured under the best conditions.

3. To permit the small fish to get free through the open meshes instead of being crushed and thrown out afterwards when the net is emptied.

4. To make the traction easier from the fact that the water is no longer so much retained in the sack as with other types of net where the meshes are closed considerably under the load.

The stays must not rest on the bottom but be as light as possible. They must in addition be held in a rigorously perpendicular plane to the bottom during traction as has been previously stated in order to ensure the opening of the drag net to a maximum extent.

The stays of a particular shape and of great height which will be hereinafter described constitute one of the characteristics of the invention.

These stays formed of spars i (Figs. 2 and 3) carry at their lower ends a stirrup j connected to the forks of the rollers f at the extremities of the pad d. They cannot rub on the bottom. At their head is connected the back cord.

Small panels of wood, marked k, are secured at a determined angle, to the upper part of the stays. These diverging panels compensate for the traction produced on the back cord c towards the inside of the drag net and likewise produce the opening of the drag net to some extent which permits of diminishing the surface of the large panels.

Goose feet l ensure traction from the top of the stays i and by the rollers f where their arms are connected. The stays thus arranged, remain perpendicular giving for this reason their full effect.

Panels as actually in use foul the ground are heavy and produce only imperfectly the lift of the drag net.

It has been suggested to incline the panels to cause them to lift from the bottom but by this they lose a large part of the diverging power for which they are made and which is only obtained by their working perpendicularly to the ground.

The modification in the arrangement of panels with depth gauge and which constitutes another characteristic of the invention overcomes these objections and permits of obtaining an apparatus which is light and efficient.

The net is provided with goose feet l which ensures the pull through the upper arm from the extremities of the back cords c and by the lower arms from the extremities of the pad d to connect up with the towing cords m.

The panels with gauge n are intercalated in these goose feet l the upper arms of which pass through the upper parts of the panels where a mesh stops them during traction. The lower arms slide on the stirrups of the bottom rollers o forming ballast for the panels and to which they are connected by a cable p of variable length according to the height which it is desired to give to the drag net. The traction carries the panels externally of the body of the drag net that is to say outside the axis of the apparatus; the rollers o are then slightly inside the panels and produce the divergence of the arms of the goose feet rectifying that which is produced by the back cord c, the head cord e and the pad d which covers the ordinary stays with panels on the bottom.

This arrangement permits of eliminating the use of the stays, the panels producing the height of the wings of the drag net the central nets h of which can then be very reduced.

The operation is the same as that for ordinary panels; the windlass directs the hawser ropes and the goose feet, the rollers come up fast with the crutch with the drag net.

The apparatus, in contact with the bottom but not penetrating it is much lighter than the others; it permits of dragging along bottoms which are inaccessible for ordinary panels, to employ drag nets which are larger and finally to effect economy in fuel while conserving a reserve of useful power for manipulating the boat.

It is to be well understood that the arrangements shown are only given by way of example and that the forms of construction, details, accessories, materials and dimensions can vary without changing the principle of the invention.

I claim:

1. A drag net having a large opening comprising a large net, a small net mounted within said large net, a head cord joining the open ends of both said nets, pads connected to said head cord, rollers carried by said pads, the net being supported on said rollers, a collector connected with said net, the upper part of said collector being larger than the lower part thereof to permit spreading, a subsidiary net disposed on each side of the longitudinal axis of said collector said nets being carried by the collector, rigid struts for spreading the mouth of the net, panels mounted on said struts compensating for traction and means connected with said struts for the traction of the net.

2. A drag net as claimed in claim 1 including goose feet connected with said panels, rollers connected with said goose feet, stirrups carried by said goose feet, bottom rollers mounted in said stirrups, said rollers constituting ballast for said panels, a cable connecting said bottom rollers with said plates, said cable being of variable length and means for dragging the net, the panels being external of the body of the net, the rollers being innermost with relation to the said panels producing divergence of the arms of the goose feet rectifying back lash.

ALPHONSE VICTOR ALEXANDRE ROBERT.